(12) United States Patent
Lin et al.

(10) Patent No.: US 7,493,675 B2
(45) Date of Patent: Feb. 24, 2009

(54) MULTI-SECTION HINGE MECHANISM

(75) Inventors: Chun-Jen Lin, Tu-Cheng (TW); Shao-Yong Huang, Shenzhen (CN)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 25 days.

(21) Appl. No.: 11/309,571

(22) Filed: Aug. 24, 2006

(65) Prior Publication Data

US 2007/0119023 A1 May 31, 2007

(30) Foreign Application Priority Data

Nov. 25, 2005 (CN) .................... 2005 1 0101787

(51) Int. Cl.
*E05D 11/10* (2006.01)
(52) U.S. Cl. .................. 16/330; 16/262; 16/268; 16/334; 16/386; 16/387
(58) Field of Classification Search ............ 16/225, 16/227, 330–332, 321, 328, 348, 329, 262, 16/263, 265, 268, 334, 386, 387; 379/433.13; 280/642, 643, 647–650, 658, 47.38, 657; 220/843–844, 832, 848, 840–841, 836; 206/454, 206/832; 403/103, 104, 326, DIG. 14; 411/508–510; 24/114.05, 618, 625, 458, 453
See application file for complete search history.

(56) References Cited

U.S. PATENT DOCUMENTS

| 1,416,656 | A | * | 5/1922 | Lyman | ........................ | 16/330 |
| 3,583,734 | A | * | 6/1971 | Magi | ........................... | 403/96 |
| 4,706,813 | A | * | 11/1987 | Schneider et al. | ........... | 206/307 |
| 4,718,127 | A | * | 1/1988 | Rittmann et al. | ............... | 2/424 |
| 4,796,339 | A | * | 1/1989 | Burke | .......................... | 24/662 |
| 5,369,842 | A | * | 12/1994 | Beatty | ........................ | 16/317 |
| 5,429,481 | A | * | 7/1995 | Liu | ............................ | 416/246 |
| 6,065,187 | A | * | 5/2000 | Mischenko | .................. | 16/341 |
| 2004/0076490 | A1 | * | 4/2004 | Bentrim | ...................... | 411/340 |

* cited by examiner

*Primary Examiner*—Chuck Y. Mah
(74) *Attorney, Agent, or Firm*—Steven M. Reiss

(57) ABSTRACT

A multi-section hinge mechanism (100) comprises a rotary member (10) and a base (20). The base includes an annular elastic arm (12) and a latching part (14) integrally extending from an inner circumferential wall of the annular elastic arm. The base defines a central hole running therethrough and a plurality of concaves (242) in one surface portion. The latching part rotatably extends through the central hole of the base. The elastic arm engages in one of the concaves of the base.

6 Claims, 5 Drawing Sheets

MULTI-SECTION HINGE MECHANISM

1. FIELD OF THE INVENTION

The present invention relates to hinge mechanisms, and particularly to a multi-section hinge mechanism for use in foldable electronic devices such as mobile telephones, electronic notebooks, and the like.

2. DESCRIPTION OF RELATED ART

With the development of wireless communication and information processing technologies, portable electronic devices such as mobile telephones and electronic notebooks are now in widespread use. These electronic devices enable consumers to enjoy high technology services anytime and anywhere. Consumers particularly favor foldable electronic devices due to their convenience and ease of storage.

Generally, a foldable electronic device has most of the electronics in one housing, called the body. The other housing, called the cover, normally contains fewer electronic components than the body. Other foldable electronic devices have all the electronics in the body, with the cover containing no electronics. Various types of hinge mechanisms are used to join a body and a cover of a foldable electronic device, so that the cover can unfold up from and fold down upon the body. Nowadays, hinge mechanisms with one or more springs are preferred by many users. Although suitable for some foldable radiotelephones, a hinge mechanism with a spring is not suitable for certain miniaturized foldable radiotelephones. This is because the housing of a miniaturized radiotelephone may not have sufficient bulk to sturdily withstand the forces generated by the spring. For these miniaturized radiotelephones it is necessary to increase the size of the housing so that it has sufficient bulk to withstand the forces generated by the spring. This in effect increases the longitudinal size of the hinge mechanism, thus increasing the overall volume of the foldable electronic device.

Furthermore, with the development of the technologies of video, image and vocal communications, foldable electronic devices having cameras installed therein have become popular. Photographic image data obtained by the camera can be transmitted by the foldable electronic device in real time. The camera may be mounted in a main body or in a cover of the foldable electronic device. Alternatively, the camera may be mounted in the hinge mechanism installed between the body and the cover. This enables the camera to be rotated within a range of angles, in order to conveniently point the camera in different directions to take desired photographs. However, the photographing part cannot rotate independently from the upper case, and thus cannot rotate to and be oriented in any desired direction.

What is needed, therefore, is a hinge assembly which overcomes above-described shortcomings.

SUMMARY OF THE INVENTION

In a first preferred embodiment, a multi-section hinge mechanism comprises a rotary member and a base. The base includes an annular elastic arm and a latching part integrally extending from an inner circumferential wall of the annular elastic arm. The base defines a central hole running therethrough and a plurality of concaves in one surface portion. The latching part rotatably extends through the central hole of the base. The elastic arm engages in one of the concaves of the base.

Other advantages and novel features will become more apparent from the following detailed description when taken in conjunction with the accompanying drawings.

BRIEF DESCRIPTION OF THE DRAWINGS

Many aspects of the multi-section hinge mechanism can be better understood with reference to the following drawings. The components in the drawings are not necessarily drawn to scale, the emphasis instead being placed upon clearly illustrating the principles of the present multi-section hinge mechanism. Moreover, in the drawings like reference numerals designate corresponding parts throughout the several views.

DETAILED DESCRIPTION OF THE INVENTION

Figure 1:
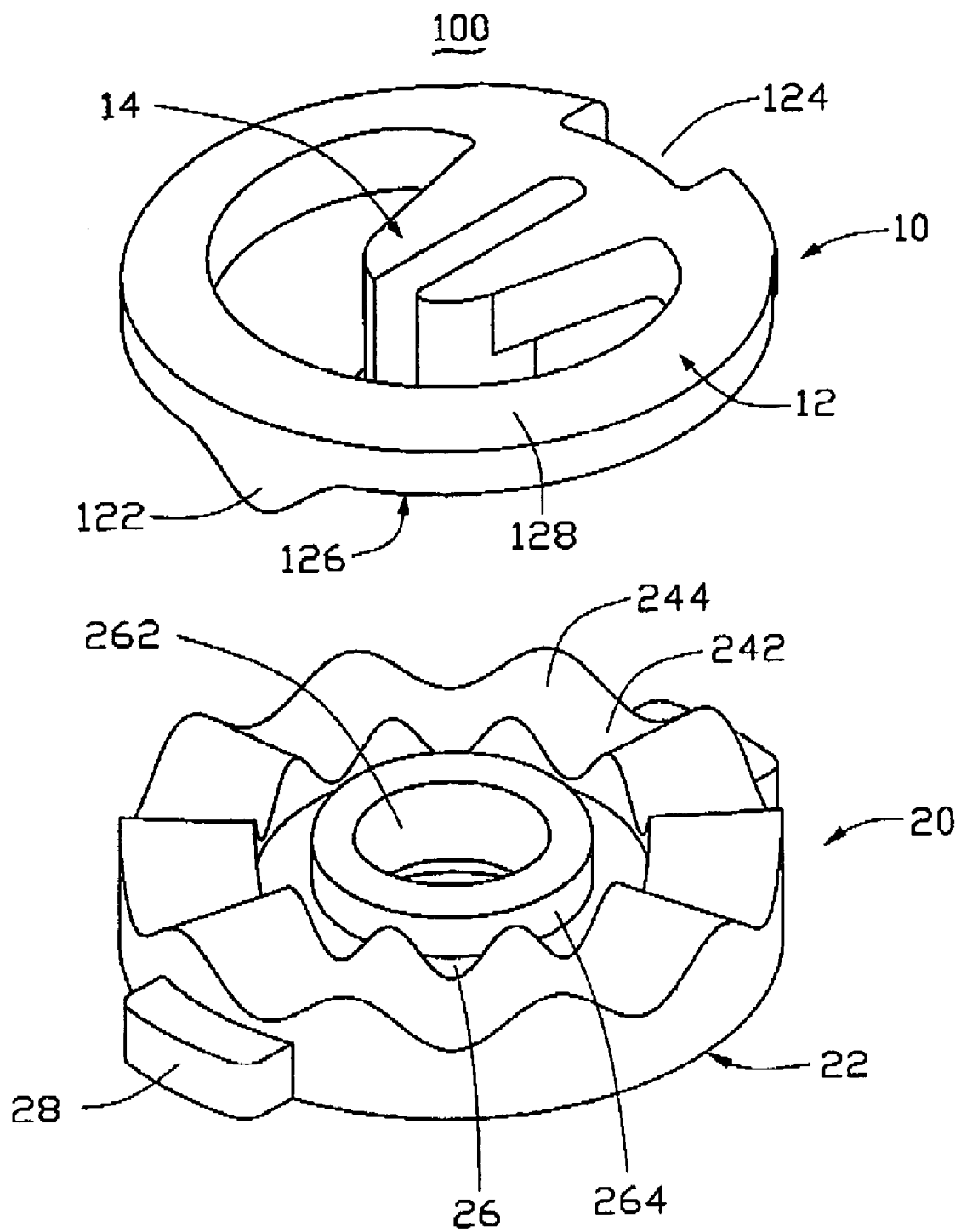
FIG. 1 is an exploded, isometric view of the multi-section hinge mechanism according to a first preferred embodiment, the hinge mechanism including a rotary member, and a base.

Referring now to the drawings, FIG. 1 shows a multi-section hinge mechanism 100 according to a preferred embodiment of the present invention. The multi-section hinge mechanism 100 can be used to support a camera, allowing the camera to be freely moved to a desired angle and stably aimed in a desired direction for taking a photograph. The multi-section hinge mechanism 100 also can be used to interconnect components like a body (not shown) and a cover (not shown) of a foldable electronic device. The multi-section hinge mechanism 100 includes a rotary member 10, and a base 20.

The base 20 is disk-shaped, and may be made of plastic material. The base 20 has a first end surface 22, and an opposite second end surface 24. The first end surface 22 is a flat surface. The second end surface 24 defines a round groove 26 extending a predetermined distance from a center of the base 20 along a radial direction. The base 20 defines a round hole 262 defined in a bottom of the round groove 26 and extending through the first end surface 22. A diameter of the round hole 262 is configured such that the two arcuate hooks 146 of the rotary member 10 can, when pressed together, pass through the round hole 262 and rotate relative to the base 20. An annular protrusion 264 protrudes around the round hole 262 from the bottom of the round groove 262. The base 20 defines a round recess 222 in the first end surface 22, for receiving the two arcuate hooks 146 of the rotary member 10. A plurality of regularly spaced arcuate concaves 242 are defined in the second end surface 24 of the base 20 and adjacent a circumferential edge of the base 20. A plurality of peaks or arcuate convexes 244 are thus each defined between adjacent valleys or arcuate concaves 242. The base 20 further includes two arcuate projections 28 which function as fixing projections, and which are symmetrically provided on an outer circumferential surface of the base 20.

Figure 2:
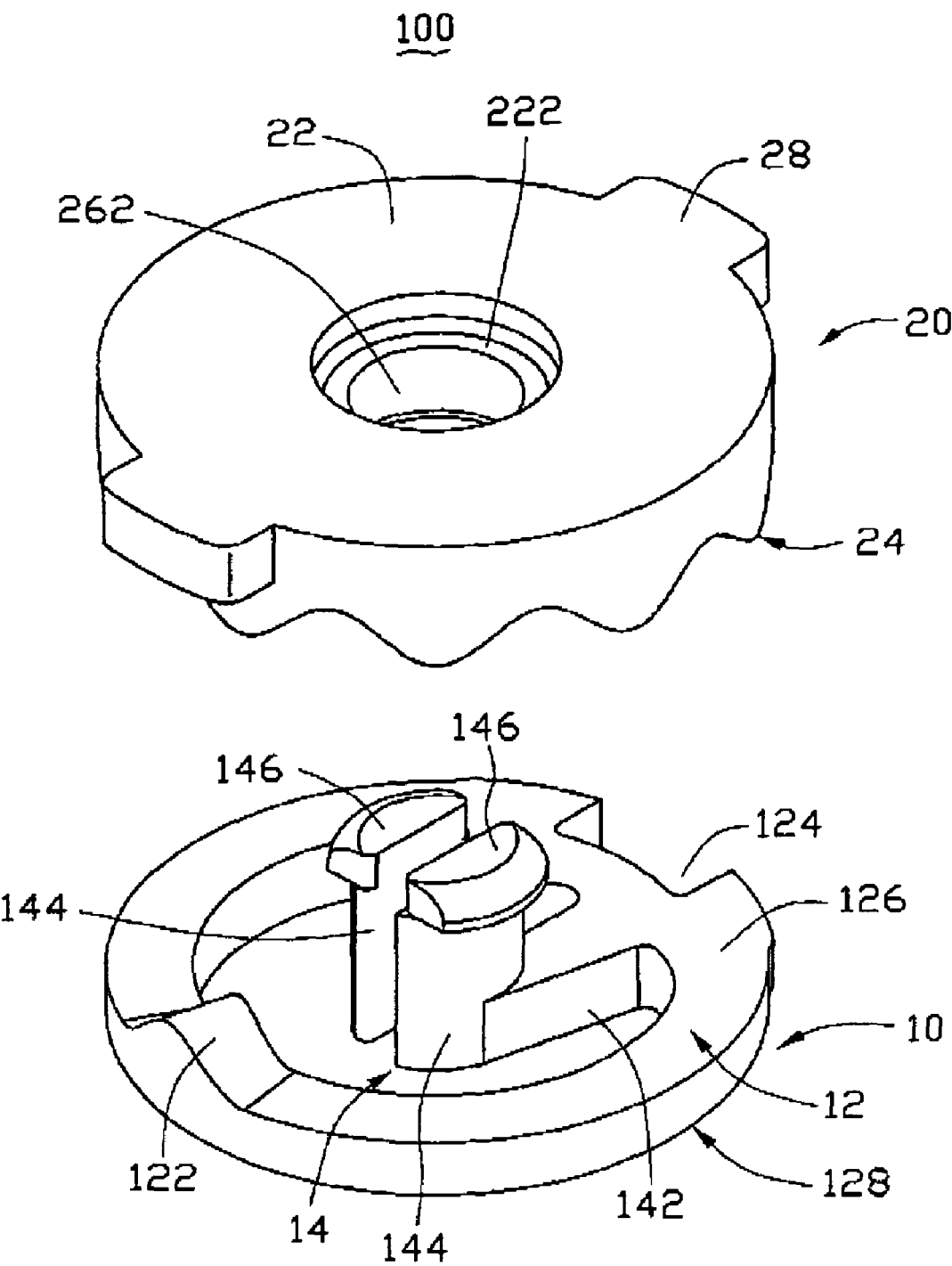
FIG. 2 is similar to FIG. 1, but shown from another aspect.

Referring to FIGS. 1-2, the rotary member 10 may be made of plastic material. The rotary member 10 includes an annular elastic arm 12, and a latching part 14. The elastic arm 12 includes a first end surface 126 and a second end surface 128. The latching part 14 extends from an inner circumferential wall of the annular elastic arm 12. The annular elastic arm 12 has an arcuate protrusion 122 disposed on the first end surface 126 thereof, and a notch 124 functioning as a stopper mechanism defined in an outer circumferential wall thereof. The latching part 14 includes two parallel connecting portions 142 radially extending from an inner circumferential wall of the annular elastic arm 12, and two parallel semi-cylindrical portions 144 perpendicularly extending from distal ends of the corresponding connecting portions 142 toward the first end surface 126 of the elastic arm 12. The semi-cylindrical portions 144 are respectively provided with two opposing arcuate hooks 146 at distal ends thereof. The arcuate protrusion 122 and the cylindrical portion 144 are positioned at one same side of the elastic arm 12.

Figure 3:
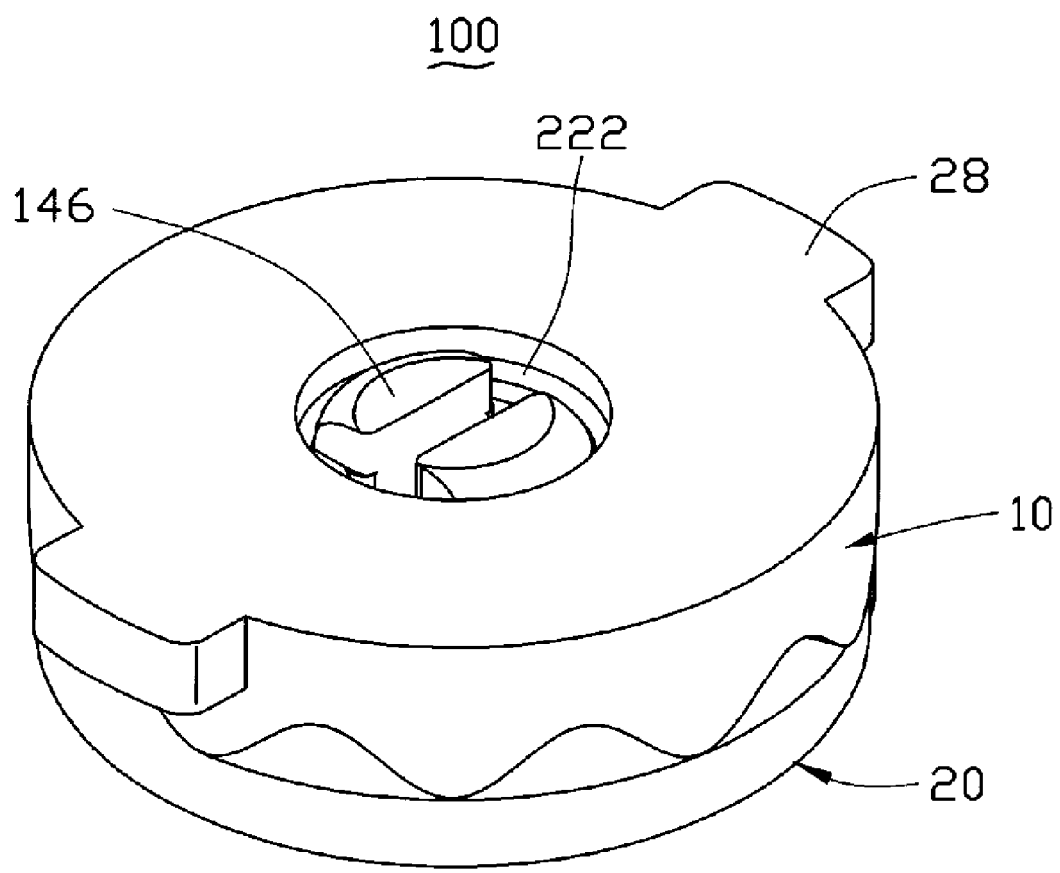
FIG. 3 is an assembled view of the multi-section hinge mechanism.
Figure 4:
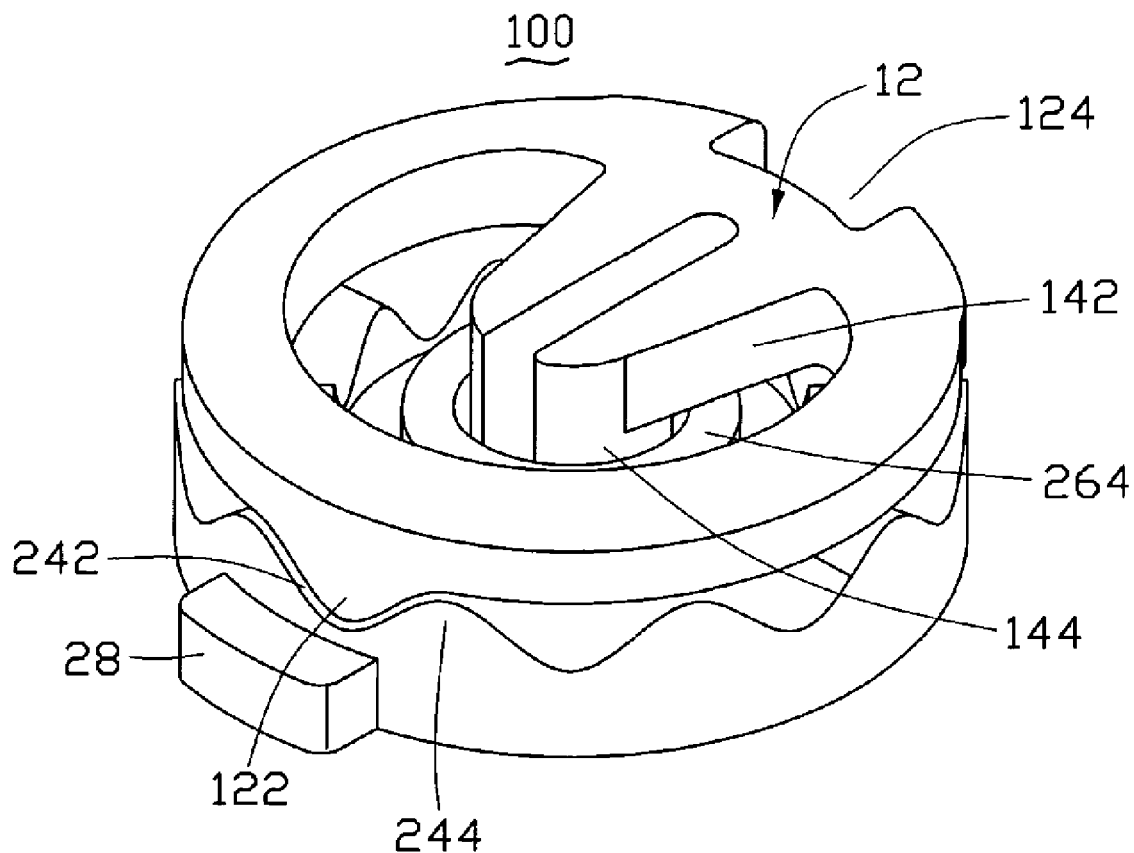
FIG. 4 is similar to FIG. 3, but shown from another aspect.

Referring to FIGS. 3-4, in assembly of the multi-section hinge mechanism 100, the rotary member 10 is locked on the base 20, with the arcuate protrusion 122 facing the base 20. The two semi-cylindrical portions 144 of the rotary member 10 are pressed together to the extent that the two hooks 16 of the rotary member 10 are joined together and pass through the round hole 262 until the two hooks 16 of the rotary member 10 are completely received in the round recess 222 of the base 20. The two semi-cylindrical portions 144 of the rotary member 10 are released and the two hooks 16 of the rotary member 10 bend away from each other, thus the rotary member 10 cannot separate from the base 20. In this state, the arcuate protrusion 122 of the rotary member 10 engages in one of the arcuate concaves 242. Thus, the multi-section hinge mechanism 100 is assembled together.

In use of the multi-section hinge mechanism 100, the base 20 may be fixed to a body via the arcuate projections 28. The rotary member 10 may be fixed to a camera via the notch 124. The camera can be manually rotated by a user. Rotation of the camera causes the rotary member 10 to rotate as well, because of a connection between the rotary member 10 and the camera. Hence, the rotary member 10 rotates relative to the base 20. Accordingly, the arcuate protrusion 122 of the rotary member 10 rotates out from the arcuate concave 242 to an adjoining arcuate convex 244 adjacent to the arcuate concave 242. At this time, the annular elastic arm 12 of the rotary member 10 is forced to lift up relative to the latching part 14 of the rotary member 10, thus undergoing an elastic deformation and accumulating elastic force, with the arcuate protrusion 122 pressing on the arcuate convex 244 of the base 20. Once the arcuate protrusion 122 has ridden over a peak of the arcuate convex 244, the elastic force exerted by the elastic arm 12 drives the arcuate protrusion 122 to move from the arcuate convex 244 and enter the adjacent arcuate concave 242. The arcuate protrusion 122 thus becomes stably locked in the adjacent arcuate concave 242. Furthermore, the above-described process can be repeated a desired number of times according to the user's requirement, with the arcuate protrusion 122 finally settling in a desired one of the arcuate concaves 242. That is, the rotary member 10 can be rotated to any of various angles needed for the user's requirement.

In alternative embodiments, the round hole 262 may be other shaped hole. The base 20 may be other shaped disk such as square disk.

The multi-section hinge mechanism can be used not only in a camera rotation mechanism of a foldable electronic device to achieve rotation and orientation of a camera to a desired angle, but also in a foldable electronic device to connect a main body and a cover thereof and achieve rotation and orientation of the cover relative to the main body. The rotary member 10 is secured in the cover via the notch 124. The base 20 is secured in the main body via the arcuate projections 28. The cover is folded down or unfolded up from the main body via the rotary member 10 rotating about the base 20.

Figure 5:
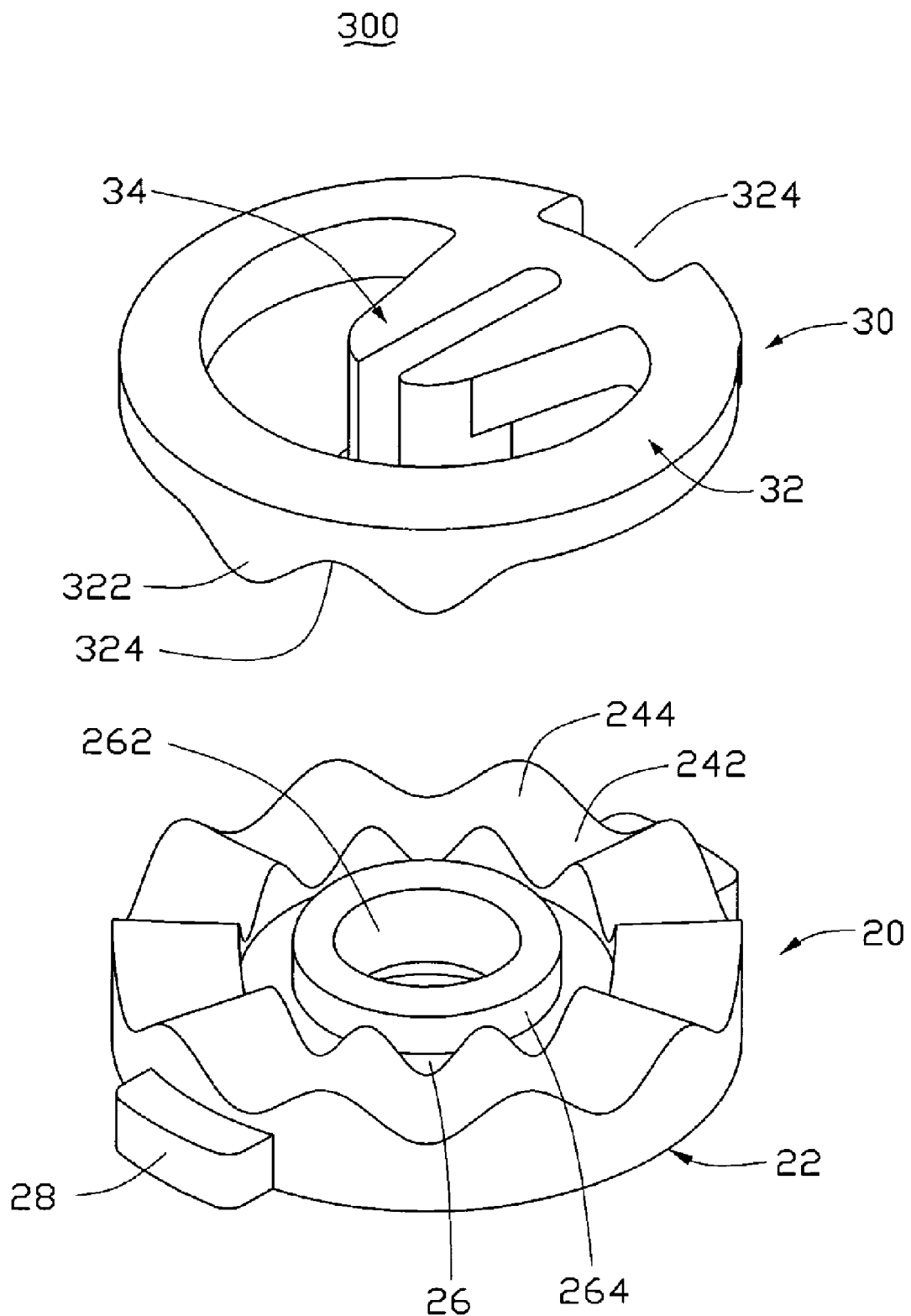
FIG. 5 is an exploded, isometric view of the multi-section hinge mechanism according to a second preferred embodiment.

Referring to FIG. 5, a multi-section hinge mechanism 300 is shown according to a second preferred embodiment. The multi-section mechanism 300 includes a rotary member 30 and the base 20.

The rotary member 30 may be made of plastic material. The rotary member 30 includes an annular elastic arm 32, and a latching part 34. The elastic arm 32 and the latching part 34 are same as the elastic arm 12 and the latching part 14 of the multi-section hinge mechanism 100. The annular elastic arm 32 has an arcuate protrusion 322 and an adjacent concave portion 324 disposed on one surface thereof, and notch 324 functioning as a stopper mechanism defined in outer circumferential wall thereof. The arcuate protrusion 322 is selectively received in one of the arcuate concave 342. The concave portion 324 selectively receives arcuate projection 244.

A main advantage of the multi-section hinge mechanism is that the multi-section hinge mechanism occupies a relatively small volume. Accordingly, the space required in an application such as a camera rotating mechanism or a mobile phone is reduced. In addition, the multi-section hinge mechanism can achieve rotation to any of a variety of different angles and thus be stably aimed in a desired direction. Furthermore, the hinge mechanism is modularized, which makes it easy to use in mass production assembly of foldable electronic devices such as mobile phones.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A multi-section hinge mechanism, comprising:
    a rotary member, the rotary member including an annular elastic arm and a latching part, the latching part including at least one connecting portion radially and integrally extending from an inner circumferential wall of the annular elastic arm, an extending portion perpendicularly extending from a corresponding distal end of each connecting portion, the elastic arm having a first end surface and a second end surface, a protrusion formed at the first end surface thereof; and
    a base, the base defining a central hole running therethrough and a plurality of concaves in a fruit surface thereof, the extending portion of the latching part rotatably extending through the central hole of the base, the protrusion of the elastic arm engaging in one of the concaves of the base.

2. The multi-section hinge mechanism as claimed in claim 1, wherein said at least one connecting portion includes two parallel connecting portions radially extending from an inner circumferential wall of the annular elastic arm, and two extending portions perpendicularly extending firm distal ends of the corresponding connecting portions toward the first end surface of the elastic arm, wherein the extending portions rotatably extend through the central hole.

3. The multi-section hinge mechanism as claimed in claim 2, wherein each extending portion is substantially semi-cylindrical, the semi-cylindrical extending portions are respectively provided with two opposite arcuate hooks at distal ends thereof, and the base has a round recess defined in an opposite second surface, the arcuate hooks being rotatably locked in the round recess.

4. The multi-section hinge mechanism as claimed in claim 3, wherein a diameter of the central hole is configured such that the two arcuate hooks of the rotary member, when compressed together, can pass through the central hole.

5. The multi-section hinge mechanism as claimed in claim 1, wherein the rotary member has a stopper mechanism formed at an outer circumferential wall of the elastic arm.

6. The multi-section hinge mechanism as claimed in claim 5, wherein the stopper mechanism is a notch.

* * * * *